US012604070B2

(12) United States Patent
Yang et al.

(10) Patent No.: US 12,604,070 B2
(45) Date of Patent: Apr. 14, 2026

(54) VIDEO PREVIEW METHOD AND APPARATUS

(71) Applicant: SHANGHAI BILIBILI TECHNOLOGY CO., LTD., Shanghai (CN)

(72) Inventors: Zhibo Yang, Shanghai (CN); Hao Liu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 100 days.

(21) Appl. No.: 18/716,892

(22) PCT Filed: Jun. 20, 2022

(86) PCT No.: PCT/CN2022/099677
§ 371 (c)(1),
(2) Date: Jun. 5, 2024

(87) PCT Pub. No.: WO2023/103325
PCT Pub. Date: Jun. 15, 2023

(65) Prior Publication Data
US 2025/0047958 A1 Feb. 6, 2025

(30) Foreign Application Priority Data

Dec. 6, 2021 (CN) .......................... 202111482159.8

(51) Int. Cl.
*H04N 21/8549* (2011.01)
*H04N 21/472* (2011.01)
(52) U.S. Cl.
CPC ... *H04N 21/8549* (2013.01); *H04N 21/47217* (2013.01)
(58) Field of Classification Search
CPC .................... H04N 21/8549; H04N 21/47217
See application file for complete search history.

(56) References Cited

U.S. PATENT DOCUMENTS 8,270,487 B1 * 9/2012 Kizhepat .......... H04N 21/25825
375/240.12
9,342,212 B2 * 5/2016 Day .................... G06F 3/04883
(Continued)

FOREIGN PATENT DOCUMENTS

CN 103634686 A 3/2014
CN 106231437 A 12/2016
(Continued)

OTHER PUBLICATIONS

International Patent Application No. PCT/CN2022/099677; Int'l Search Report; dated Sep. 1, 2022; 3 pages.

*Primary Examiner* — James R Sheleheda
(74) *Attorney, Agent, or Firm* — BakerHostetler

(57) ABSTRACT

This application provides video preview techniques. The techniques comprise detecting a preview operation performed on a target video cover in a video preview page, and determining an operation duration of the preview operation, wherein the video preview page comprises video covers of at least two videos, a page container is provided at a position where each video cover is displayed in the video preview page, and each page container is configured to detect a preview operation performed on a corresponding video cover; determining a player container associated with a page container of the target video cover when the operation duration reaches a duration threshold, wherein the player container is configured to carry a target player of playing video content; loading the target player carried in the player container, and playing video content corresponding to the target video cover at a position of the target video cover through the target player.

20 Claims, 5 Drawing Sheets

Detect a preview operation for a target video cover in a video preview page, and determine operation duration of the preview operation, where the video preview page includes video covers of at least two videos, a page container is provided, in the video preview page, at a position where each video cover should theoretically be displayed, and the page container is used to detect a preview operation for a corresponding video cover ⟩ 102

Determine a player container associated with a page container of the target video cover when the operation duration reaches a duration threshold, where the player container is used to carry a target player for playing video content ⟩ 104

Load the target player carried in the player container, and play video content corresponding to the target video cover on the target video cover by using the target player ⟩ 106

(56)                References Cited

U.S. PATENT DOCUMENTS

| | | | |
|---|---|---|---|
| 10,862,940 B1 * | 12/2020 | Jones | H04L 65/1059 |
| 2008/0040322 A1 * | 2/2008 | Rucker | G06F 16/986 |
| | | | 707/E17.118 |
| 2009/0006451 A1 * | 1/2009 | Estrada | G06F 16/9577 |
| | | | 707/999.102 |
| 2009/0024923 A1 * | 1/2009 | Hartwig | G06F 16/70 |
| | | | 715/716 |
| 2009/0182889 A1 * | 7/2009 | Hurst | H04L 65/80 |
| | | | 709/231 |
| 2009/0228897 A1 * | 9/2009 | Murray | G06F 9/544 |
| | | | 719/313 |
| 2011/0016000 A1 * | 1/2011 | Cronshaw | H04N 21/84 |
| | | | 705/14.55 |
| 2011/0307782 A1 * | 12/2011 | Demarta | G11B 27/34 |
| | | | 715/716 |
| 2011/0307785 A1 * | 12/2011 | Demarta | H04N 21/4782 |
| | | | 715/719 |
| 2014/0040273 A1 * | 2/2014 | Cooper | G06F 16/41 |
| | | | 707/E17.061 |
| 2015/0026715 A1 * | 1/2015 | Bernstein | H04N 21/812 |
| | | | 725/32 |
| 2016/0103563 A1 * | 4/2016 | Greenberg | G06F 3/0482 |
| | | | 715/738 |
| 2016/0334973 A1 | 11/2016 | Reckhow et al. | |
| 2019/0163336 A1 * | 5/2019 | Yu | H04N 21/4314 |
| 2020/0145726 A1 * | 5/2020 | Ciuca | H04N 21/435 |
| 2020/0213642 A1 * | 7/2020 | Bartos | H04N 21/6587 |
| 2021/0306397 A1 * | 9/2021 | Nicastri | H04N 21/439 |
| 2023/0336839 A1 * | 10/2023 | Liu | G06F 40/109 |
| 2025/0047958 A1 * | 2/2025 | Yang | H04N 21/47217 |

FOREIGN PATENT DOCUMENTS

| | | | | |
|---|---|---|---|---|
| CN | 106791953 A | 5/2017 | | |
| CN | 108810641 A | 11/2018 | | |
| CN | 109246461 A | 1/2019 | | |
| CN | 110691282 A | 1/2020 | | |
| CN | 111327917 A | 6/2020 | | |
| CN | 111432278 A | 7/2020 | | |
| CN | 111970566 A | 11/2020 | | |
| CN | 113286189 A | 8/2021 | | |
| CN | 113365150 A | 9/2021 | | |
| CN | 114205675 A | 3/2022 | | |
| CN | 115309395 A * | 11/2022 | | G06F 8/38 |
| CN | 119576319 A * | 3/2025 | | G06Q 10/101 |
| WO | WO-2023103325 A1 * | 6/2023 | | H04N 21/431 |

* cited by examiner

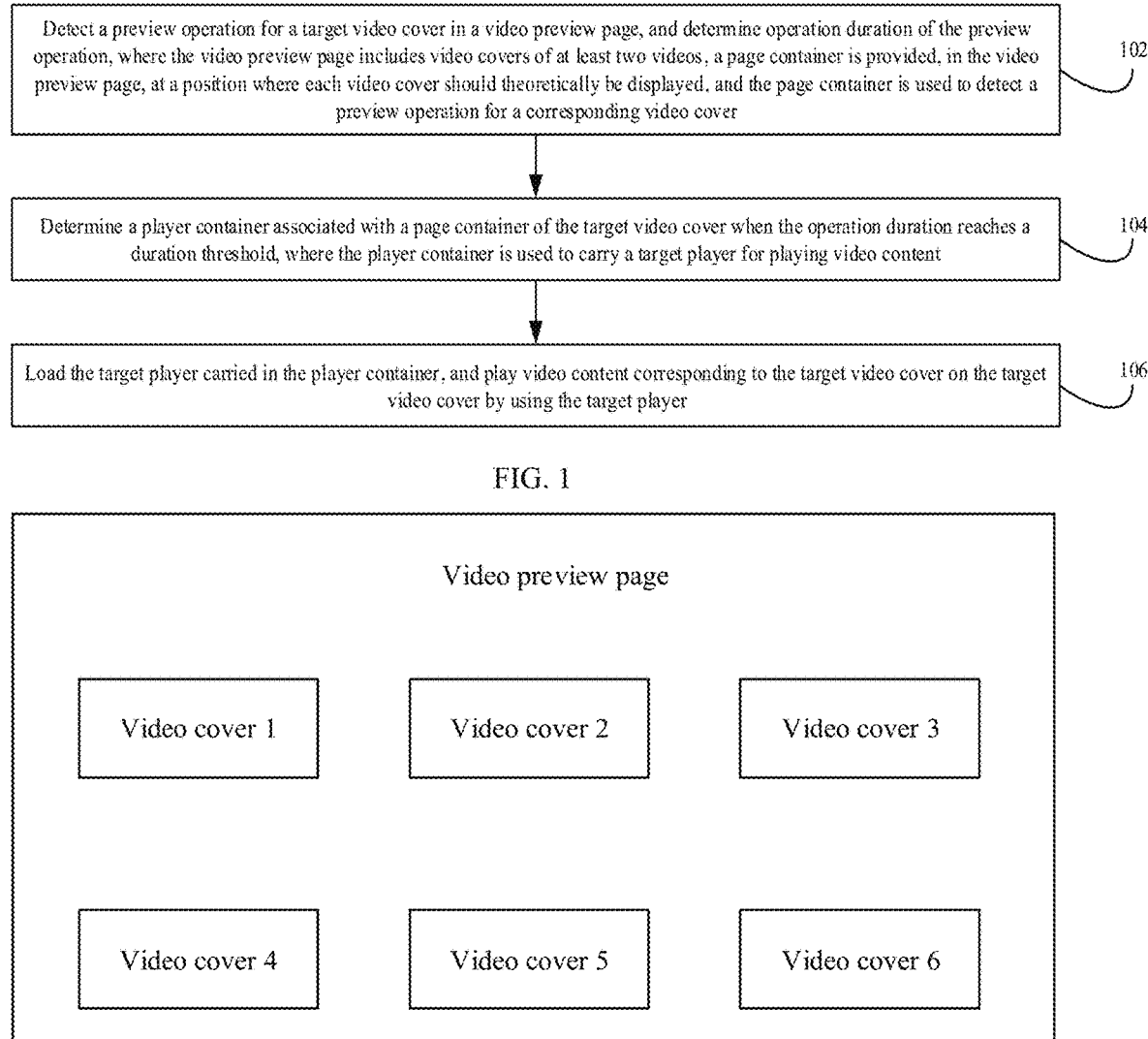

Detect a preview operation for a target video cover in a video preview page, and determine operation duration of the preview operation, where the video preview page includes video covers of at least two videos, a page container is provided, in the video preview page, at a position where each video cover should theoretically be displayed, and the page container is used to detect a preview operation for a corresponding video cover — 102

Determine a player container associated with a page container of the target video cover when the operation duration reaches a duration threshold, where the player container is used to carry a target player for playing video content — 104

Load the target player carried in the player container, and play video content corresponding to the target video cover on the target video cover by using the target player — 106

FIG. 1

Video preview page

| Video cover 1 | Video cover 2 | Video cover 3 |

| Video cover 4 | Video cover 5 | Video cover 6 |

FIG. 2

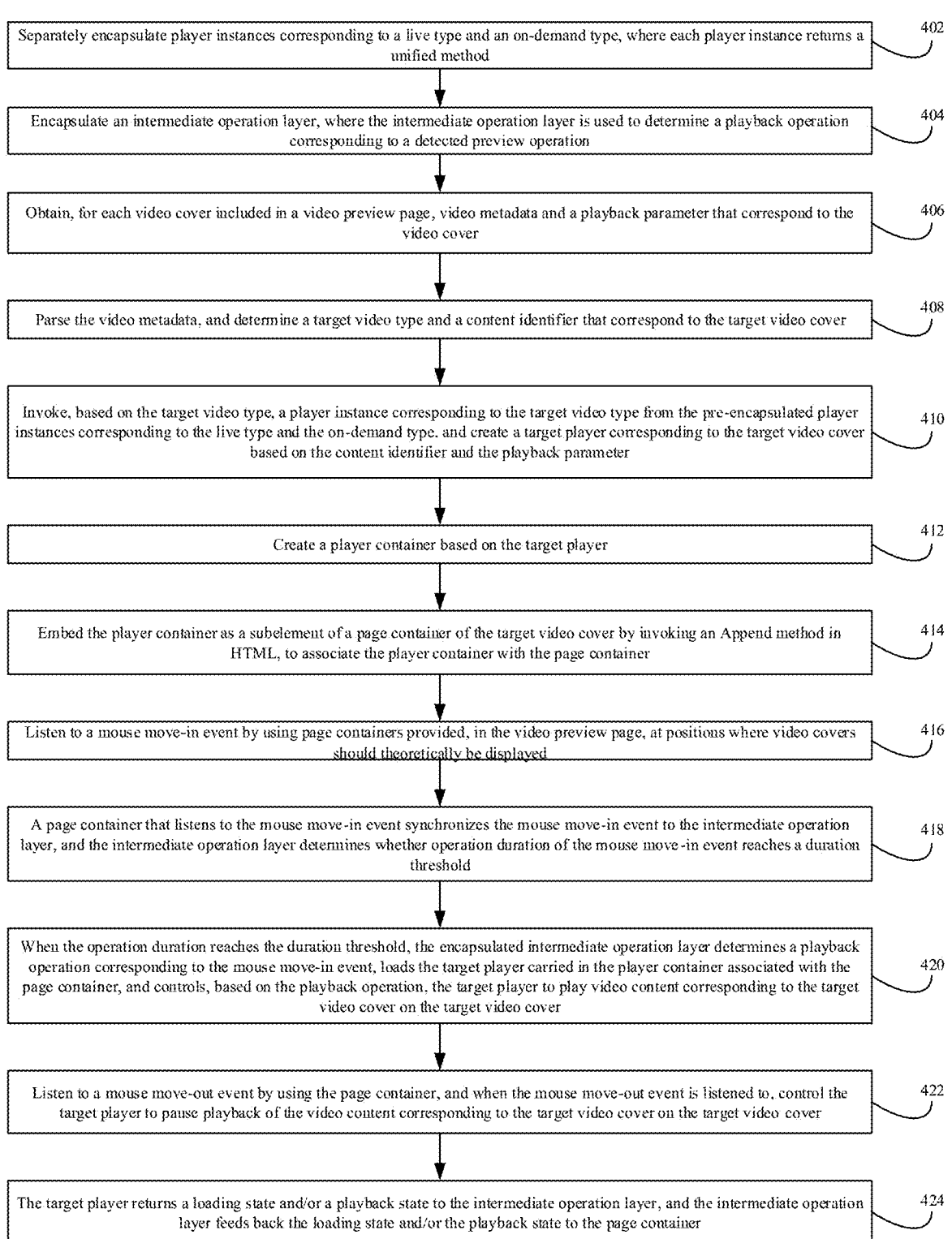

Separately encapsulate player instances corresponding to a live type and an on-demand type, where each player instance returns a unified method — 402

Encapsulate an intermediate operation layer, where the intermediate operation layer is used to determine a playback operation corresponding to a detected preview operation — 404

Obtain, for each video cover included in a video preview page, video metadata and a playback parameter that correspond to the video cover — 406

Parse the video metadata, and determine a target video type and a content identifier that correspond to the target video cover — 408

Invoke, based on the target video type, a player instance corresponding to the target video type from the pre-encapsulated player instances corresponding to the live type and the on-demand type, and create a target player corresponding to the target video cover based on the content identifier and the playback parameter — 410

Create a player container based on the target player — 412

Embed the player container as a subelement of a page container of the target video cover by invoking an Append method in HTML, to associate the player container with the page container — 414

Listen to a mouse move-in event by using page containers provided, in the video preview page, at positions where video covers should theoretically be displayed — 416

A page container that listens to the mouse move-in event synchronizes the mouse move-in event to the intermediate operation layer, and the intermediate operation layer determines whether operation duration of the mouse move-in event reaches a duration threshold — 418

When the operation duration reaches the duration threshold, the encapsulated intermediate operation layer determines a playback operation corresponding to the mouse move-in event, loads the target player carried in the player container associated with the page container, and controls, based on the playback operation, the target player to play video content corresponding to the target video cover on the target video cover — 420

Listen to a mouse move-out event by using the page container, and when the mouse move-out event is listened to, control the target player to pause playback of the video content corresponding to the target video cover on the target video cover — 422

The target player returns a loading state and/or a playback state to the intermediate operation layer, and the intermediate operation layer feeds back the loading state and/or the playback state to the page container — 424

FIG. 4

VIDEO PREVIEW METHOD AND APPARATUS

CROSS-REFERENCE TO RELATED APPLICATIONS

This application is the U.S. National Stage of International Application No. PCT/CN2022/099677, filed on Jun. 20, 2022, which claims priority to Chinese Patent Application No. 202111482159.8, filed on Dec. 6, 2021, and entitled "VIDEO PREVIEW METHOD AND APPARATUS", which are incorporated herein by reference in their entireties.

TECHNICAL FIELD

This application relates to the field of video processing technologies, and in particular, to a video preview method. This application also relates to a video preview apparatus, a computing device, a computer-readable storage medium, and a computer program product.

BACKGROUND

With rapid development of computer technologies and network technologies, various videos emerge, and the videos are involved in many aspects of work and life of people. Compared with still pictures, the videos carry more rich and expressive information, making them increasingly popular and appreciated by users.

In the conventional technology, a plurality of videos may be displayed in a video preview page, and a single still picture cover or a plurality of picture frames are displayed for each video, so that a user positions a video of interest.

However, the picture frame is only an overview of video content, and incomplete content may lead to incomplete interpretation of the video by the user. In addition, the picture frame is captured from the video, has limited definition, cannot be adapted to different screen sizes, and cannot support a live video. Consequently, a video preview effect is poor, the user cannot quickly and accurately select the video of interest, frequent playback and exit are caused, and a misplay rate is high.

SUMMARY

In view of this, embodiments of this application provide a video preview method. This application also relates to a video preview apparatus, a computing device, a computer-readable storage medium, and a computer program product, so as to resolve technical problems of a poor video preview effect and a high misplay rate in the conventional technology.

According to a first aspect of the embodiments of this application, a video preview method is provided, including:

detecting a preview operation for a target video cover in a video preview page, and determining operation duration of the preview operation, where the video preview page includes video covers of at least two videos, a page container is provided, in the video preview page, at a position where each video cover should theoretically be displayed, and the page container is used to detect a preview operation for a corresponding video cover;

determining a player container associated with a page container of the target video cover when the operation duration reaches a duration threshold, where the player container is used to carry a target player for playing video content; and loading the target player carried in the player container, and playing video content corresponding to the target video cover on the target video cover by using the target player.

According to a second aspect of the embodiments of this application, a video preview apparatus is provided, including:

a detection means, configured to detect a preview operation for a target video cover in a video preview page, and determine operation duration of the preview operation, where the video preview page includes video covers of at least two videos, a page container is provided, in the video preview page, at a position where each video cover should theoretically be displayed, and the page container is used to detect a preview operation for a corresponding video cover;

a determining means, configured to determine a player container associated with a page container of the target video cover when the operation duration reaches a duration threshold, where the player container is used to carry a target player for playing video content; and a playback means, configured to load the target player carried in the player container, and play video content corresponding to the target video cover on the target video cover by using the target player.

According to a third aspect of the embodiments of this application, a computing device is provided, including:

a memory and a processor, where the memory is configured to store computer-executable instructions, and the processor is configured to execute the computer-executable instructions to implement the following method:

detecting a preview operation for a target video cover in a video preview page, and determining operation duration of the preview operation, where the video preview page includes video covers of at least two videos, a page container is provided, in the video preview page, at a position where each video cover should theoretically be displayed, and the page container is used to detect a preview operation for a corresponding video cover;

determining a player container associated with a page container of the target video cover when the operation duration reaches a duration threshold, where the player container is used to carry a target player for playing video content; and loading the target player carried in the player container, and playing video content corresponding to the target video cover on the target video cover by using the target player.

According to a fourth aspect of the embodiments of this application, a computer-readable storage medium is provided. The computer-readable storage medium stores computer-executable instructions. When the computer-executable instructions are executed by a processor, steps of any video preview method are implemented.

According to a fifth aspect of the embodiments of this application, a computer program product is provided. When the computer program product is executed in a computer, the computer is enabled to perform steps of any video preview method.

According to the video preview method provided in this application, the preview operation for the target video cover in the video preview page can be detected, and the operation duration of the preview operation is determined, where the video preview page includes the video covers of the at least two videos, a page container is provided, in the video preview page, at a position where each video cover should theoretically be displayed, and the page container is used to detect the preview operation for the corresponding video cover; when the operation duration reaches the duration threshold, the player container associated with the page container of the target video cover is determined, where the player container is used to carry the target player for playing the video content; and the target player carried in the player container is loaded, and the video content corresponding to the target video cover is played on the target video cover by using the target player.

In this case, video covers included in the video preview page are provided with corresponding page containers. The page container can provide a capability of detecting a preview operation for a corresponding video cover, that is, the page container of the target video cover can detect the preview operation. When the operation duration of the preview operation reaches the duration threshold, the player container associated with the page container of the target video cover can be determined, and the video content corresponding to the target video cover is played on the target video cover by using the target player carried in the player container. In this way, a user only needs to perform a preview operation for any video cover in the video preview page, to automatically preview corresponding complete video content on the video cover, so that the user fully interprets a video. In addition, original complete video content is directly played without a screenshot in a preview process. This manner can be adapted to screens with different resolution and can support a live video, thereby greatly improving a video preview effect. The user can preview the complete video content in the video preview page, to quickly and accurately determine whether the user is interested, thereby reducing a misplay rate. In addition, a corresponding player is invoked to play corresponding video content on a video cover for preview only when the operation duration of the preview operation reaches the duration threshold, thereby avoiding a misoperation in a sliding process and saving playback resources.

BRIEF DESCRIPTION OF DRAWINGS

FIG. 1 is a flowchart of a video preview method according to an embodiment of this application;

FIG. 2 is a schematic diagram of a video preview page according to an embodiment of this application;

FIG. 4 is a flowchart of another video preview method according to an embodiment of this application;

DESCRIPTION OF EMBODIMENTS

Figure 3:
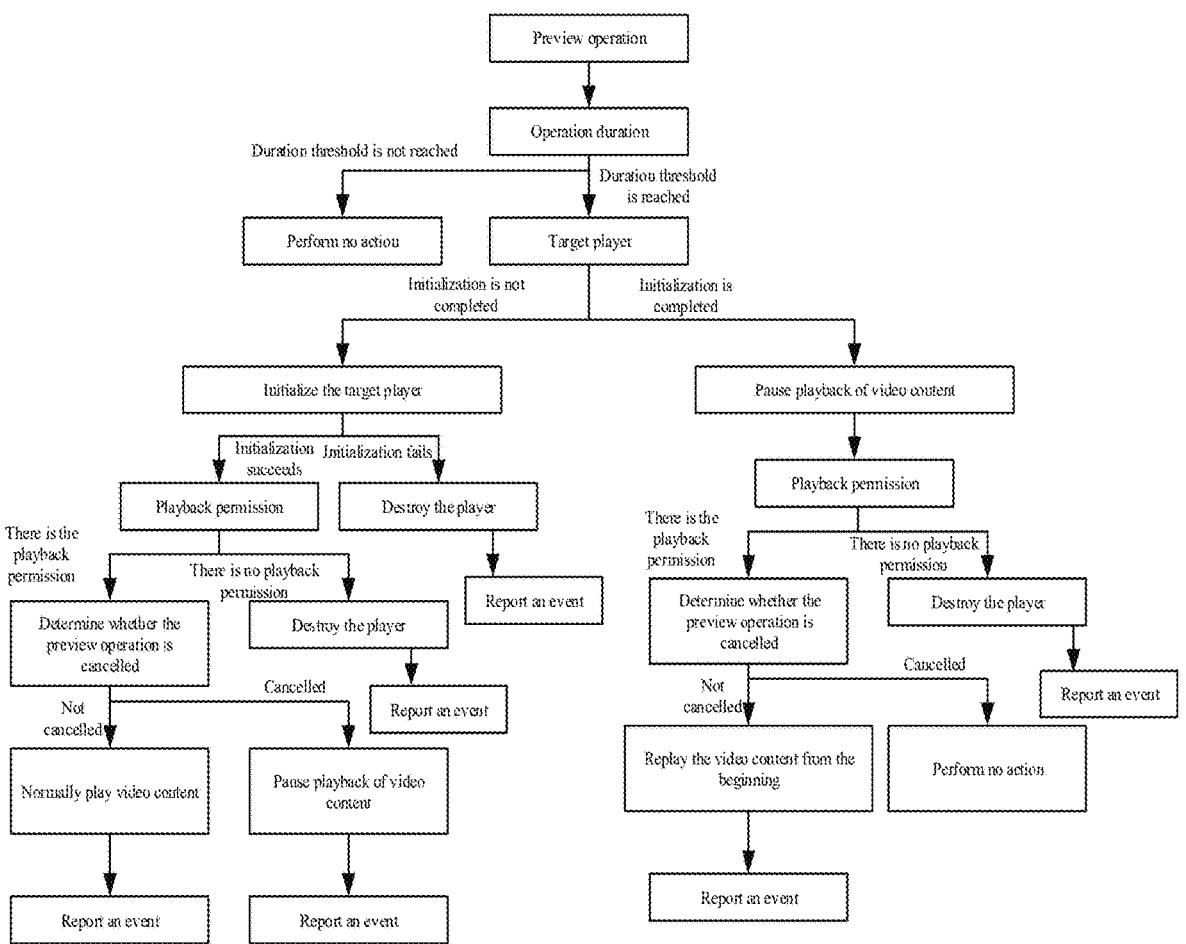
FIG. 3 is a schematic flowchart of playing video content according to an embodiment of this application.

Many specific details are described in the following descriptions to facilitate full understanding of this application. However, this application can be implemented in many other manners different from those described herein. A person skilled in the art can make similar promotion without departing from the connotation of this application. Therefore, this application is not limited to specific implementations disclosed below.

Terms used in one or more embodiments of this application are merely used to describe specific embodiments, and are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although the terms such as "first" and "second" may be used in one or more embodiments of this application to describe various types of information, the information should not be limited to these terms. These terms are merely used to distinguish between information of a same type. For example, without departing from the scope of the one or more embodiments of this application, "first" may also be referred to as "second", and similarly, "second" may also be referred to as "first". Depending on the context, for example, the word "if" used herein can be interpreted as "while", "when", or "in response to determining".

This application provides a video preview method. This application also relates to a video preview apparatus, a computing device, a computer-readable storage medium, and a computer program product, which are described in detail in the following embodiments one by one.

FIG. 1 is a flowchart of a video preview method according to an embodiment of this application. The method specifically includes the following steps.

Step 102: Detect a preview operation for a target video cover in a video preview page, and determine operation duration of the preview operation, where the video preview page includes video covers of at least two videos, a page container is provided, in the video preview page, at a position where each video cover should theoretically be displayed, and the page container is used to detect a preview operation for a corresponding video cover.

Specifically, the video preview page may be a page that includes a plurality of videos for a user to select for playback. The video preview page displays video covers of the videos. The video covers each may be a cover image used to overview the video or a picture frame captured from video content. After tapping to select a specific video cover, the user can enter a playback interface of a video corresponding to the video cover.

In addition, the target video cover is any one of a plurality of video covers included in the video preview page, and each video cover corresponds to one page container. The page container, namely, cardContainer, can provide a capability of detecting a preview operation for a corresponding video cover, that is, the page container can detect whether the preview operation for the corresponding video cover is received. The preview operation may be a preset operation for previewing video content corresponding to a specific video cover.

In a possible implementation, the preview operation for the target video cover may be an operation of controlling a selection control to move to enter the target video cover, for example, the page container may provide a playback entrance based on a mouse event, that is, may detect a mouse move-in (mouseenter) event. The user may operate a mouse, so that the selection control controlled by the mouse moves to enter the target video cover. In this case, the preview operation for the target video cover is detected. Alternatively, the page container may detect a keyboard control signal, that is, the user may operate a keyboard, so that the selection control controlled by the keyboard moves to enter the target video cover. In this case, the preview operation for the target video cover is detected.

In another possible implementation, screen sliding of a touchscreen device may be controlled by using a finger or a stylus, to select a video corresponding to a specific video cover for playback. Therefore, the preview operation for the target video cover may alternatively be an operation of touching the target video cover by using the finger or the stylus, that is, the preview operation for the target video cover is detected when the finger or the stylus touches the target video cover. Alternatively, the preview operation for the target video cover may be an operation of sliding the target video cover to a page edge or the like, that is, the preview operation for the target video cover is detected when the target video cover is slid to the page edge of the video preview page.

In actual application, the video preview page may include a plurality of video covers, a page container is provided, in the video preview page, at a position where each video cover should theoretically be displayed, and each page container may determine whether a preview operation is detected. A video cover that corresponds to the page container and for which the preview operation is detected is the target video cover. Subsequently, a player carried in a player container associated with the page container may be invoked to play complete video content corresponding to the target video cover for preview, thereby improving a preview effect.

In addition, the video preview page is usually slid in a process in which the user views the video preview page. In a sliding process, the preview operation for the target video cover may be falsely triggered. Therefore, to avoid false trigger, the operation duration of the preview operation may be further determined. Subsequently, whether the detected preview operation for the target video cover is a misoperation may be determined based on the operation duration. When the detected preview operation for the target video cover is not a misoperation, the corresponding video content is played, thereby improving preview accuracy and saving playback resources.

In a specific implementation, if the preview operation is the operation that the selection control moves to enter the target video cover, the operation duration is duration in which the selection control is located in the target video cover; if the preview operation is the operation that the finger or the stylus touches the target video cover, the operation duration may be duration of touching the target video cover; or if the preview operation is the operation of sliding the target video cover to the page edge, the operation duration may be duration in which the target video cover is located at the page edge.

For example, FIG. 2 is a schematic diagram of a video preview page according to an embodiment of this application. As shown in FIG. 2, the video preview page includes video covers of six videos, which are respectively a video cover 1, a video cover 2, a video cover 3, a video cover 4, a video cover 5, and a video cover 6, where a page container 1 is provided at a position where the video cover 1 should theoretically be displayed, a page container 2 is provided at a position where the video cover 2 should theoretically be displayed, a page container 3 is provided at a position where the video cover 3 should theoretically be displayed, a page container 4 is provided at a position where the video cover 4 should theoretically be displayed, a page container 5 is provided at a position where the video cover 5 should theoretically be displayed, and a page container 6 is provided at a position where the video cover 6 should theoretically be displayed. It is assumed that the page container 3 detects the mouse move-in event (that is, the preview operation), and then the target video cover is the video cover 3. In this case, it indicates that the user wants to preview video content of the video cover 3. Then, duration in which the mouse is located in the video cover 3 may be determined, so that whether a detected preview operation for the video cover 3 is a misoperation in a sliding process can be subsequently determined.

In an optional implementation of this embodiment, players corresponding to the videos may be further encapsulated and created in advance and be associated with the page containers, so that video content can be played by using a corresponding player when the preview operation for the target video cover in the video preview page is detected. To be specific, before the detecting a preview operation for a target video cover in a video preview page, the method may further include:

obtaining video metadata and a playback parameter that correspond to the target video cover;

creating a target player for video content corresponding to the target video cover based on the video metadata and the playback parameter; and creating a player container based on the target player, and embedding the player container as a subelement of the page container of the target video cover.

It should be noted that metadata, also referred to as intermediate data or relay data, is data about data, is mainly information used to describe a data property, and is used to support functions such as indication of a storage position, historical data and resource searching, and file recording. The video metadata may be data used to describe the video content corresponding to the target video cover. The playback parameter may be a parameter for controlling a playback process of the video content corresponding to the target video cover, for example, delay time, playback definition, a playback speed, or playback duration.

In actual application, the target video cover may be any video cover in the video preview page. The video metadata and the playback parameter of the video content corresponding to the target video cover may be obtained, and then a target player for the video content corresponding to the target video cover is created based on the obtained video metadata and playback parameter. Subsequently, the target player may be used to play the video content corresponding to the target video cover.

In addition, the player container may be further created based on the target player after a target player for the video content corresponding to the target video cover is created, that is, the player container is used to carry the created target player. Then, the player container may be further associated with the page container, so that the associated player container can be found after the page container detects the preview operation, and the player carried in the player container is invoked to play the corresponding video content.

In a specific implementation, a corresponding creation method may be invoked based on a type of the target player and a programming language, to create a corresponding player container, namely, playerContainer. The player container may carry the created target player for the video content corresponding to the target video cover. In addition, a CardDOM.appendChild( ) method in a hyper text markup language (HTML) may be invoked, to embed the player container (internal container) as the subelement of the page container (external container), to associate the player container with the page container.

In this embodiment of this application, the video preview page includes video covers of a plurality of videos, and content, types, duration of the videos corresponding to the video covers are different from each other. Therefore, a corresponding player may be created for each video cover, is carried in a corresponding player container, and is associated with the page container corresponding to the video cover, so that video content of the video cover can be subsequently played by using the corresponding player.

In an optional implementation of this embodiment, before a target player for the video content corresponding to the target video cover is created, players corresponding to different video types may be further pre-encapsulated. To be specific, before the creating a target player for the video content corresponding to the target video cover based on the video metadata and the playback parameter, the method may further include:

separately encapsulating player instances corresponding to at least two video types.

Correspondingly, a specific implementation process of creating a target player for the video content corresponding to the target video cover based on the video metadata and the playback parameter may be as follows:

parsing the video metadata, and determining a target video type and a content identifier that correspond to the target video cover; and invoking, based on the target video type, a player instance corresponding to the target video type from the pre-encapsulated player instances corresponding to the at least two video types, and creating the target player corresponding to the target video cover based on the content identifier and the playback parameter.

Specifically, the video type may be a playback type of a video. For example, the video type may be a live type or an on-demand type. An instance may be referred to as an object, and an object is referred to as an instance. Instantiation refers to a process of instantiating an object. The player instance may refer to an encapsulated player object.

It should be noted that videos of different video types usually need to be played by using different players. Therefore, the player instances corresponding to the at least two video types may be separately pre-encapsulated. Each pre-encapsulated player instance returns a unified method for invoking when a player corresponding to a specific video is created subsequently, that is, different players may be instantiated subsequently based on related information of specific video content of a specific video. For example, an on-demand player and a live player may be separately encapsulated in a unified specification, and each player returns a unified method replay (load), connect (initialize), close (disable), or the like.

In actual application, after the player instances corresponding to the at least two video types are pre-encapsulated, when a target player for the video content corresponding to the target video cover is created based on the video metadata and the playback parameter, the pre-encapsulated player for the type corresponding to the target video cover may be invoked. The corresponding player is created based on a content feature of the video content corresponding to the target video cover by using a constructor function, that is, the player for the video content corresponding to the target video cover is instantiated.

In a specific implementation, the video metadata may be parsed to determine the target video type and the content identifier that correspond to the target video cover, where the target video type is a type of the video content corresponding to the target video cover, and a player instance for a corresponding type may be invoked subsequently. In addition, the content identifier may be an identifier of the video content corresponding to the target video cover, and the video content corresponding to the target video cover may be obtained based on the content identifier. The content identifier may be a storage address, a file name identifier, or the like of the video content corresponding to the target video cover. Then, the player instance corresponding to the target video type may be invoked from the pre-encapsulated player instances corresponding to the at least two video types based on the target video type, and the target player corresponding to the target video cover is created based on the content identifier and the playback parameter, where the created target player is a player that can play the video content corresponding to the target video cover.

In an optional implementation of this embodiment, in addition to separately pre-encapsulating the player instances corresponding to the at least two video types, an intermediate operation layer may be further encapsulated. To be specific, after the separately encapsulating player instances corresponding to at least two video types, the method may further include:

encapsulating an intermediate operation layer, where the intermediate operation layer is used to determine a playback operation corresponding to the detected preview operation.

It should be noted that the intermediate operation layer may receive the preview operation detected by the page container, and control, based on the preview operation and according to a preset control policy (for example, a delay policy or an anti-jitter policy), the target player in the player container associated with the page container to implement, for example, initialization, playback, or pause, thereby implementing control on the target player.

In a possible implementation, the encapsulated intermediate operation layer carries means such as a mouse operation state instance (mouselns), a player lifecycle event instance (playerEvents), and a player instance (player). The mouse operation state instance (mouselns) may obtain the preview operation detected by the page container; the player instance (player) may determine, based on the preview operation detected by the page container, to control a player to perform an operation, for example, initialization, playback, or pause; and the player lifecycle event instance (playerEvents) may store and record lifecycle states such as initialization, playback, and pause of a player, that is, after the player performs a corresponding operation, a lifecycle state of the player may be returned to the intermediate operation layer. The intermediate operation layer may record and transmit a corresponding lifecycle state to the external page container by using a custom event (CustomEvent) of JavaScript (JS).

In actual application, after the preview operation for the target video cover is detected by the page container provided for the target video cover, the preview operation may be synchronized to the pre-encapsulated intermediate operation layer, and the intermediate operation layer determines the operation duration of the preview operation, to determine whether the preview operation detected by the page container is a misoperation, and further determine to control the target player corresponding to the video content of the target video cover to perform an operation.

For example, the page container may provide a carrier, a mouse event of the carrier may be used as an entrance/exit (mouseenter-mouse move-in event, mouseleave-mouse move-out event) of a playback operation. The intermediate operation layer receives a response after the mouse event is triggered. After receiving instructions provided by the mouse event, the intermediate operation layer may notify, according to a preset policy of the intermediate operation layer, a player to play corresponding video content.

In this embodiment of this application, the video preview page may include the plurality of video covers, a page container is provided, in the video preview page, at a position where each video cover should theoretically be displayed, and each page container may determine whether the preview operation is detected. The video cover that corresponds to the page container and for which the preview operation is detected is the target video cover. Subsequently, the player carried in the player container associated with the page container may be invoked to play the complete video content corresponding to the target video cover for preview, thereby improving the preview effect. In addition, the operation duration of the preview operation may be further determined. Subsequently, whether the detected preview operation for the target video cover is a misoperation may be determined based on the operation duration. When the detected preview operation for the target video cover is not a misoperation, the corresponding video content is played, thereby improving preview accuracy and saving playback resources.

Step 104: Determine a player container associated with a page container of the target video cover when the operation duration reaches a duration threshold, where the player container is used to carry a target player for playing video content.

Specifically, the duration threshold may be a preset value for determining whether the preview operation is a misoperation, for example, the duration threshold may be 200 ms, 300 ms, or the like.

It should be noted that if the operation duration does not reach the duration threshold, it indicates that the detected preview operation may be merely an operation that the user normally slides the video preview page, and does not mean that the user wants to preview the video content corresponding to the target video cover. Therefore, the detected preview operation may not be responded to in this case. If the operation duration reaches the duration threshold, it indicates that the detected preview operation is an operation triggered by the user to preview the video content corresponding to the target video cover. In this case, the player container associated with the page container of the target video cover may be determined, so that the corresponding video content is subsequently played by using the target player carried in the player container associated with the page container, to implement preview.

In actual application, after the preview operation for the target video cover is detected by the page container, the page container may synchronize the detected preview operation to the intermediate operation layer. The intermediate operation layer may determine whether the operation duration reaches the duration threshold, to determine whether to invoke the player container associated with the page container of the target video cover, to control the player to perform the playback operation.

In this embodiment of this application, the delay policy may be preset for the intermediate operation layer. A corresponding player is invoked to play the corresponding video content on the video cover for preview only when the operation duration of the preview operation reaches the duration threshold, thereby avoiding the misoperation in the sliding process and saving playback resources.

Step 106: Load the target player carried in the player container, and play video content corresponding to the target video cover on the target video cover by using the target player.

It should be noted that the target player carried in the player container may be loaded after the player container associated with the page container of the target video cover is determined. The video content corresponding to the target video cover is played on the target video cover by using the target player, to directly play the complete video content on the target video cover in the video preview page for preview by the user.

The video content corresponding to the target video cover may include audio and video data of the video corresponding to the target video cover, and may further include bullet-screen comment data of the video corresponding to the target video cover, that is, as the video progresses, the bullet-screen comment data of the video corresponding to the target video cover may also be played on the target video cover in the video preview page for preview by the user, thereby enhancing content interaction experience.

In the foregoing example, audio and video data and bullet-screen comment data of a video corresponding to the video cover 3 may be played at a position of the video cover 3 in the video preview page by using a target player corresponding to the video cover 3, so that the user directly previews complete content of the corresponding video at the position of the video cover 3 in the video preview page.

In this embodiment of this application, the user only needs to perform a preview operation for any video cover in the video preview page, to automatically preview corresponding complete video content on the video cover, so that the user fully interprets a video. In addition, original complete video content is directly played without a screenshot in a preview process. This manner can be adapted to screens with different resolution and can support a live video, thereby greatly improving a video preview effect. The user can preview the complete video content in the video preview page, to quickly and accurately determine whether the user is interested, thereby reducing a misplay rate.

In an optional implementation of this embodiment, when the player is controlled to play the corresponding video content, whether the player is initialized may be further determined first. To be specific, a specific implementation process of loading the target player carried in the player container, and playing the video content corresponding to the target video cover on the target video cover by using the target player may be as follows:

determining whether the target player is initialized; and initializing the target player when the target player is not initialized, and playing the video content corresponding to the target video cover on the target video cover by using the target player after initialization succeeds.

It should be noted that if the target player is not initialized, the target player may be initialized first. After initialization, the target player is controlled to play the video content corresponding to the target video cover on the target video cover.

In an optional implementation of this embodiment, after initialization is completed, whether a current user has a video playback permission may be further determined, and then the player is controlled to play the corresponding video content. To be specific, before the playing video content corresponding to the target video cover on the target video cover by using the target player, the method may further include:

determining whether there is a playback permission for the video content corresponding to the target video cover;

if there is the playback permission, determining whether the preview operation is cancelled; and when the preview operation is not cancelled, performing the operation step of playing video content corresponding to the target video cover on the target video cover by using the target player; or when the preview operation is cancelled, pausing playback of the video content corresponding to the target video cover on the target video cover.

In actual application, because playback permissions are required for playing some videos, for example, a members-only video, a membership video, and videos corresponding to different user levels, after the target player is successfully initialized, whether the user that triggers the preview operation has the playback permission for the video content corresponding to the target video cover may be further determined. For example, the video content corresponding to the target video cover is a members-only video. In this case, whether the user that triggers the preview operation is logged in may be determined. If the user is not logged in, it is determined that the user does not have the playback permission. If the user is logged in, whether user information of the user includes a membership identifier is further determined; and if the user information of the user includes the membership identifier, it indicates that the user is a member user and has the playback permission, or if the user information of the user does not include the membership identifier, it indicates that the user is not a member user and does not have the playback permission.

It should be noted that, for a video that requires the playback permission, whether there is the playback permission for the video content corresponding to the target video cover may be further determined after the target player is initialized, thereby ensuring that the video that requires the playback permission can be previewed by only the user having the playback permission, and improving video security.

In addition, the user may further cancel the preview operation after triggering the preview operation for the target video cover. Therefore, after it is determined that there is the playback permission, whether the preview operation is cancelled may be further determined, to determine whether to continue to control the target player to play the video content corresponding to the target video cover on the target video cover.

In a specific implementation, when the preview operation is the operation that the selection control moves to enter the target video cover, determining of whether the preview operation is cancelled may be determining of whether the selection control is detected moving out the target video cover. When the preview operation is the mouse move-in event, determining of whether the preview operation is cancelled may be determining of whether the mouse move-out event is detected. In addition, when the preview operation is the operation that the finger or the stylus touches the target video cover, determining of whether the preview operation is cancelled may be determining of whether the finger or the stylus is detected to be raised. When the preview operation is the operation of sliding the target video cover to the page edge, determining of whether the preview operation is cancelled may be determining of whether the target video cover is away from the page edge of the video preview page.

In this embodiment of this application, if the preview operation is not cancelled, it indicates that the user wants to continue to preview the corresponding video content on the target video cover. Therefore, in this case, the operation step of playing video content corresponding to the target video cover on the target video cover by using the target player may be performed. If it is detected that the preview operation is cancelled, it indicates that the user temporarily does not need to continue to preview the corresponding video content on the target video cover. Therefore, in this case, playback of the video content corresponding to the target video cover may be paused on the target video cover, but the player is not disabled. When the preview operation corresponding to the target video cover is detected again, the player may be directly controlled to play the corresponding video content. In this way, the user conveniently previews video content corresponding to a same video cover for a plurality of times in a short time.

Further, when playback of the video content corresponding to the target video cover is paused on the target video cover, a time point at which playback is paused may be further recorded, so that the user can subsequently directly position the video content to the time point at which playback is paused last time for continuous playback when previewing the video content corresponding to the target video cover again in a short time. In this case, there is no need to replay the video content corresponding to the target video cover from the beginning.

In an optional implementation of this embodiment, if it is determined that the target player is initialized, the target player may be directly controlled to play the corresponding video content without being re-initialized. To be specific, after the determining whether the target player is initialized, the method may further include:

when the target player is initialized, determining whether the preview operation is cancelled; and if the preview operation is not cancelled, replaying the video content corresponding to the target video cover on the target video cover by using the target player.

It should be noted that, after the target player is initialized last time, if only playback of the video content corresponding to the target video cover is paused on the target video cover, but the player is not disabled, when the preview operation corresponding to the target video cover is detected again, the target player is already initialized. In this case, the player can be directly controlled to play the corresponding video content.

Further, whether the user cancels the preview operation may alternatively be determined, to determine whether to continue to control the target player to play the video content corresponding to the target video cover on the target video cover. If the preview operation is not cancelled, it indicates that the user hopes to continue to preview the corresponding video content on the target video cover. Therefore, in this case, the video content corresponding to the target video cover may be directly replayed on the target video cover by using the target player; or if the preview operation is cancelled, playback is paused.

In this embodiment of this application, when the user wants to preview the video content corresponding to the target video cover again, the player may not need to be initialized again, and the video content corresponding to the target video cover is directly replayed on the target video cover by using the initialized target player, thereby saving processing resources consumed by initialization of the player.

In addition, in addition to directly replaying the video content corresponding to the target video cover on the target video cover by using the target player, if the time point at which playback of the video content corresponding to the target video cover is paused last time is recorded, the video content corresponding to the target video cover may be directly played on the target video cover by using the target player from the time point at which playback is paused.

In actual application, whether to replay the video content corresponding to the target video cover from the beginning or continue to play the video content corresponding to the target video cover from the recorded time point at which playback is paused may be determined based on a time interval between a time point at which the preview operation is detected this time and a time point at which playback of the video content corresponding to the target video cover is paused last time. If the time interval between the time point at which the preview operation is detected this time and the time point at which playback of the video content corresponding to the target video cover is paused last time is greater than an interval threshold, the video content corresponding to the target video cover is replayed from the beginning. If the time interval between the time point at which the preview operation is detected this time and the time point at which playback of the video content corresponding to the target video cover is paused last time is not greater than the interval threshold, the time point at which playback is paused last time may be obtained, to continue to play the video content corresponding to the target video cover from the time point.

In this embodiment of this application, when the user previews the video content corresponding to the target video cover in a short time, the video content may be directly positioned to the time point at which playback is paused last time for continuous playback, and the video content corresponding to the target video cover does not need to be replayed from the beginning, so that when the user triggers the preview operation again in a short time, a position in which playback is paused last time can be found to resume playback, thereby improving user watching experience and saving playback resources.

In an optional implementation of this embodiment, after the user cancels the preview operation for the target video cover, the user does not disable the corresponding target player, but only playback is paused. In this way, the user conveniently previews the video content corresponding to the target video cover again in a short time. If the user does not preview the video content corresponding to the target video cover again for a long time, the corresponding target player may be disabled. To be specific, after the playing video content corresponding to the target video cover on the target video cover by using the target player, the method may further include:

detecting whether the preview operation is cancelled;

when the preview operation is cancelled, determining whether the preview operation for the target video cover is detected again in second preset duration after the preview operation is cancelled; and if the preview operation for the target video cover is not detected again in the second preset duration after the preview operation is cancelled, disabling the target player.

Specifically, the second preset duration may be a preset time period, and is used to determine whether the user initiates a preview operation for a specific video cover again in a period of time. For example, the second preset duration may be 3 minutes, 5 minutes, 10 minutes, or the like.

It should be noted that, when it is detected that the preview operation for the target video cover is cancelled, playback of the corresponding video content at the position of the target video cover by using the target player may be paused. Then, whether the preview operation for the target video cover is detected again in the second preset duration after the preview operation is cancelled may be determined. If the preview operation for the target video cover is detected again in the second preset duration after the preview operation is cancelled, it indicates that the user triggers the preview operation for the target video cover again, and wants to preview the corresponding video content again. In this case, the target player may not need to be initialized, and the initialized target player is directly controlled to play the corresponding video content. If the preview operation for the target video cover is not detected again in the second preset duration after the preview operation is cancelled, it indicates that the user does not trigger the preview operation for the target video cover again in a long time. In this case, the target player may be disabled, thereby saving processing resources and space. If the user subsequently triggers the preview operation for the target video cover again, the target player may be re-initialized, to play the corresponding video content at the position of the video cover.

In addition, after the target player is disabled, data related to the target player may be deleted, so as to save memory space, for example, data such as initialization data and running data of the player and the time point at which playback is paused.

For example, FIG. 3 is a schematic flowchart of playing video content according to an embodiment of this application. As shown in FIG. 3, after the preview operation for the target video cover is detected, the operation duration of the preview operation may be determined. If the operation duration of the preview operation does not reach the duration threshold, no action is performed. If the operation duration of the preview operation reaches the duration threshold, the player container associated with the page container of the target video cover is determined, and whether the target player carried in the player container is initialized is determined. If initialization is not completed, the target player is initialized. After initialization succeeds, whether there is the playback permission for the video content corresponding to the target video cover is determined. If there is the playback permission, whether the preview operation is cancelled is determined. If the preview operation is not cancelled, the video content is normally played; or if the preview operation is cancelled, playback of the video content is paused. If there is no playback permission, the player is destroyed. If initialization fails, the player is destroyed.

If initialization is completed, it indicates that playback of the video content corresponding to the target video cover is paused. In this case, whether there is the playback permission for the video content corresponding to the target video cover may be determined. If there is the playback permission, whether the preview operation is cancelled is determined. If the preview operation is not cancelled, the video content is replayed from the beginning; or if the preview operation is cancelled, no action is performed. If there is no playback permission, the player is destroyed.

In addition, as shown in FIG. 3, after an action is performed for the target player, an event may be reported to the intermediate operation layer, so that the intermediate operation layer can record lifecycle states such as initialization, playback, and pause of the target player.

In an optional implementation of this embodiment, if the intermediate operation layer is pre-encapsulated, the playback operation of the target player may be controlled by using the intermediate operation layer. To be specific, a specific implementation process of playing video content corresponding to the target video cover on the target video cover by using the target player may be as follows:

determining the playback operation corresponding to the preview operation by using the encapsulated intermediate operation layer; and controlling, based on the playback operation, the target player to play the video content corresponding to the target video cover on the target video cover.

It should be noted that the intermediate operation layer may receive the preview operation detected by the page container, then determine a corresponding playback operation based on the preview operation, and control working states such as initialization, playback, and pause of the target player based on the playback operation.

For example, the preview operation received by the intermediate operation layer is the mouse move-in event, and the preset delay policy may be pre-encapsulated in the intermediate operation layer. After the preview operation is detected, if the operation duration of the preview operation reaches the duration threshold, it is determined that the playback operation corresponding to the mouse move-in event is initialization of the player. In this case, the corresponding target player may be loaded to control the target player to be initialized.

In an optional implementation of this embodiment, after the loading the target player carried in the player container, and playing video content corresponding to the target video cover on the target video cover by using the target player, the method may further include:

feeding back a loading state and/or a playback state of the target player to the page container.

The loading state of the target player may include whether initialization is completed, and playback states include states such as playback and pause. In actual application, after performing a corresponding operation, the target player may further return an execution result to the intermediate operation layer, that is, the lifecycle states such as the loading state and/or the playback state. The intermediate operation layer may record the received loading state, playback state, and/or the like, and feed back the received loading state, playback state, and/or the like to the external page container. Statistics of information such as a quantity of loading times of each of target players corresponding to the video covers may be collected by using the external page container, for use in analysis.

In an optional implementation of this embodiment, in addition to presetting the delay policy to avoid falsely triggering the preview operation in the process of sliding the video preview page, the anti-jitter policy may be further preset to avoid responding to a preview operation for a same video cover for a plurality of times in a short time. To be specific, before the loading the target player carried in the player container, the method may further include:

determining whether the preview operation is a preview operation first detected for the target video cover in first preset duration; and if the preview operation is the preview operation first detected for the target video cover in the first preset duration, performing the operation step of loading the target player carried in the player container.

Specifically, the first preset duration may be a preset time period, and is used to determine whether the user triggers the preview operation for the target video cover for a plurality of times in a short time. For example, the first preset duration may be 1 second, 5 seconds, or 8 seconds.

It should be noted that, before the target player carried in the player container is loaded, whether the detected preview operation is the preview operation first detected for the target video cover in the first preset duration may be further determined. If the detected preview operation is the preview operation first detected for the target video cover in the first preset duration, it indicates that the detected preview operation is a preview operation first initiated by the user for the target video cover in a short time. In this case, the target player carried in the player container may be loaded in response to the preview operation, and the video content corresponding to the target video cover is played on the target video cover by using the target player. If the detected preview operation is not the preview operation first detected for the target video cover in the first preset duration, it indicates that the user initiates the preview operation for the target video cover for a plurality of times in a short time, and response is made only when the user first initiates the preview operation for the target video cover. Therefore, in this case, the preview operation may not be responded to, that is, the operation step of loading the target player carried in the player container, and playing video content corresponding to the target video cover on the target video cover by using the target player is not performed. In this way, frequent trigger of the preview operation for the target video cover in a short time may be avoided, and frequent playback of the video content corresponding to the target video cover on the target video cover in a short time may be avoided, thereby saving playback resources.

According to the video preview method provided in this application, the video covers included in the video preview page are provided with corresponding page containers. The page container can provide a capability of detecting a preview operation for a corresponding video cover, that is, the page container of the target video cover can detect the preview operation. When the operation duration of the preview operation reaches the duration threshold, the player container associated with the page container of the target video cover can be determined, and the video content corresponding to the target video cover is played on the target video cover by using the target player carried in the player container. In this way, the user only needs to perform a preview operation for any video cover in the video preview page, to automatically preview corresponding complete video content on the video cover, so that the user fully interprets a video. In addition, original complete video content is directly played without a screenshot in a preview process. This manner can be adapted to screens with different resolution and can support a live video, thereby greatly improving a video preview effect. The user can preview the complete video content in the video preview page, to quickly and accurately determine whether the user is interested, thereby reducing a misplay rate.

In addition, a corresponding player is invoked to play the corresponding video content on the video cover for preview only when the operation duration of the preview operation reaches the duration threshold, thereby avoiding the misoperation in the sliding process and saving playback resources. In addition, response is made only when the user first initiates the preview operation for the target video cover, to avoid frequent playback of the video content corresponding to the target video cover on the target video cover in a short time, thereby saving playback resources.

FIG. 4 is a flowchart of another video preview method according to an embodiment of this application. The method specifically includes the following steps:

Step 402: Separately encapsulate player instances corresponding to a live type and an on-demand type, where each player instance returns a unified method.

Step 404: Encapsulate an intermediate operation layer, where the intermediate operation layer is used to determine a playback operation corresponding to a detected preview operation.

Step 406: Obtain, for each video cover included in a video preview page, video metadata and a playback parameter that correspond to the video cover.

Step 408: Parse the video metadata, and determine a target video type and a content identifier that correspond to a target video cover.

Step 410: Invoke, based on the target video type, a player instance corresponding to the target video type from the pre-encapsulated player instances corresponding to the live type and the on-demand type, and create a target player corresponding to the target video cover based on the content identifier and the playback parameter.

Step 412: Create a player container based on the target player.

Step 414: Embed the player container as a subelement of a page container of the target video cover by invoking an Append method in an HTML, to associate the player container with the page container.

Step 416: Listen to a mouse move-in event by using page containers provided for video covers in the video preview page.

Step 418: A page container that listens to the mouse move-in event synchronizes the mouse move-in event to the intermediate operation layer, and the intermediate operation layer determines whether operation duration of the mouse move-in event reaches a duration threshold.

Step 420: When the operation duration reaches the duration threshold, the encapsulated intermediate operation layer determines a playback operation corresponding to the mouse move-in event, loads the target player carried in the player container associated with the page container, and controls, based on the playback operation, the target player to play video content corresponding to the target video cover on the target video cover.

The target video cover is a video cover corresponding to the page container that listens to the mouse move-in event.

In an optional implementation of this embodiment, in addition to presetting a delay policy to avoid falsely triggering the preview operation in a process of sliding the video preview page, an anti-jitter policy may be further preset to avoid responding to a preview operation for a same video cover for a plurality of times in a short time. To be specific, before the loading the target player carried in the player container, the method may further include:

determining whether the preview operation is a preview operation first detected for the target video cover in first preset duration; and if the preview operation is the preview operation first detected for the target video cover in the first preset duration, performing the operation step of loading the target player carried in the player container.

Step 422: Listen to a mouse move-out event by using page container, and when the mouse move-out event is listened to, control the target player to pause playback of the video content corresponding to the target video cover on the target video cover.

Step 424: The target player returns a loading state and/or a playback state to the intermediate operation layer, and the intermediate operation layer feeds back the loading state and/or the playback state to the page container.

According to the video preview method provided in this application, the video covers included in the video preview page are provided with corresponding page containers. The page container can provide a capability of detecting a preview operation for a corresponding video cover, that is, the page container of the target video cover can detect the preview operation. When the operation duration of the preview operation reaches the duration threshold, the player container associated with the page container of the target video cover can be determined, and the video content corresponding to the target video cover is played on the target video cover by using the target player carried in the player container. In this way, the user only needs to perform a preview operation for any video cover in the video preview page, to automatically preview corresponding complete video content on the video cover, so that the user fully interprets a video. In addition, original complete video content is directly played without a screenshot in a preview process. This manner can be adapted to screens with different resolution and can support a live video, thereby greatly improving a video preview effect. The user can preview the complete video content in the video preview page, to quickly and accurately determine whether the user is interested, thereby reducing a misplay rate.

In addition, a corresponding player is invoked to play the corresponding video content on the video cover for preview only when the operation duration of the preview operation reaches the duration threshold, thereby avoiding a misoperation in the sliding process and saving playback resources. In addition, response is made only when the user first initiates the preview operation for the target video cover, to avoid frequent playback of the video content corresponding to the target video cover on the target video cover in a short time, thereby saving playback resources.

Figure 5:
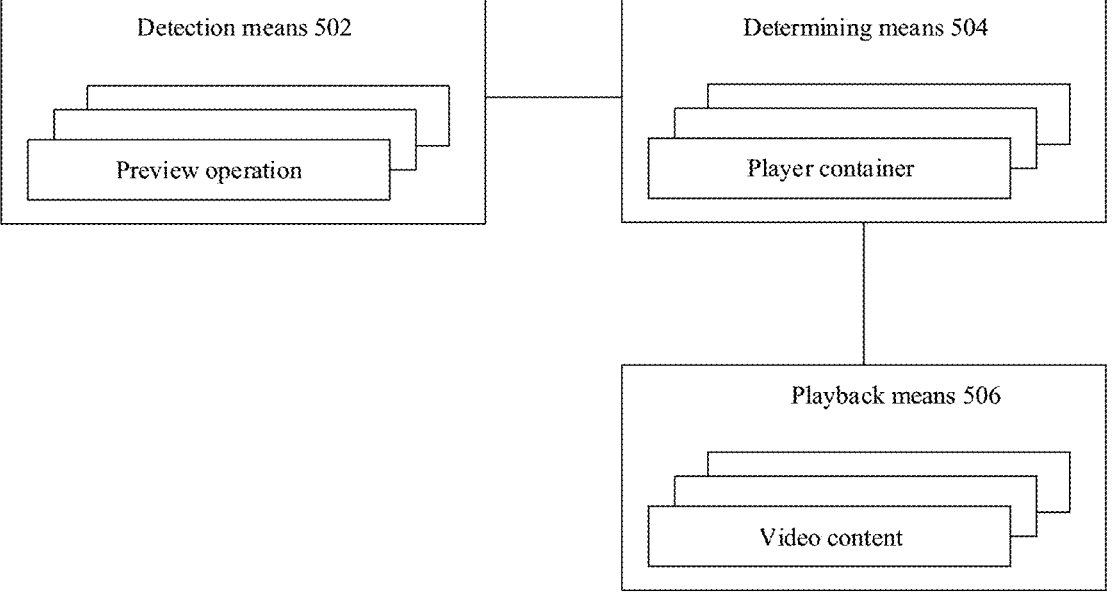
FIG. 5 is a schematic diagram of a structure of a video preview apparatus according to an embodiment of this application.

Corresponding to the foregoing method embodiments, this application further provides an embodiment of a video preview apparatus. FIG. 5 is a schematic diagram of a structure of a video preview apparatus according to an embodiment of this application. As shown in FIG. 5, the apparatus includes:

a detection means 502, configured to detect a preview operation for a target video cover in a video preview page, and determine operation duration of the preview operation, where the video preview page includes video covers of at least two videos, a page container is provided, in the video preview page, at a position where each video cover should theoretically be displayed, and the page container is used to detect a preview operation for a corresponding video cover;

a determining means 504, configured to determine a player container associated with a page container of the target video cover when the operation duration reaches a duration threshold, where the player container is used to carry a target player for playing video content; and a playback means 506, configured to load the target player carried in the player container, and play video content corresponding to the target video cover on the target video cover by using the target player.

Optionally, the apparatus further includes a creation means, configured to:

obtain video metadata and a playback parameter that correspond to the target video cover;

create the target player for video content corresponding to the target video cover based on the video metadata and the playback parameter; and create the player container based on the target player, and embed the player container as a subelement of the page container of the target video cover.

Optionally, the creation means is further configured to:

separately encapsulate player instances corresponding to at least two video types; and parse the video metadata, and determine a target video type and a content identifier that correspond to the target video cover; and invoke, based on the target video type, a player instance corresponding to the target video type from the pre-encapsulated player instances corresponding to the at least two video types, and create the target player corresponding to the target video cover based on the content identifier and the playback parameter.

Optionally, the creation means is further configured to:

encapsulate an intermediate operation layer, where the intermediate operation layer is used to determine a playback operation corresponding to the detected preview operation.

Correspondingly, the playback means 506 is further configured to:

determine the playback operation corresponding to the preview operation by using the encapsulated intermediate operation layer; and control, based on the playback operation, the target player to play the video content corresponding to the target video cover on the target video cover.

Optionally, the apparatus further includes an extraction means, configured to:

determine whether the preview operation is a preview operation first detected for the target video cover in first preset duration; and if the preview operation is the preview operation first detected for the target video cover in the first preset duration, perform the operation step of loading the target player carried in the player container.

Optionally, the playback means 506 is further configured to:

determine whether the target player is initialized; and initialize the target player when the target player is not initialized, and play the video content corresponding to the target video cover on the target video cover by using the target player after initialization succeeds.

Optionally, the playback means 506 is further configured to:

determine whether there is a playback permission for the video content corresponding to the target video cover;

if there is the playback permission, determine whether the preview operation is cancelled; and when the preview operation is not cancelled, perform the operation step of playing video content corresponding to the target video cover on the target video cover by using the target player; or when the preview operation is cancelled, pause playback of the video content corresponding to the target video cover on the target video cover.

Optionally, the playback means 506 is further configured to:

when the target player is initialized, determine whether the preview operation is cancelled; and if the preview operation is not cancelled, replay the video content corresponding to the target video cover on the target video cover by using the target player.

Optionally, the apparatus further includes a detection means, configured to:

detect whether the preview operation is cancelled;

when the preview operation is cancelled, determine whether the preview operation for the target video cover is detected again in second preset duration after the preview operation is cancelled; and if the preview operation for the target video cover is not detected again in the second preset duration after the preview operation is cancelled, disable the target player.

Optionally, the apparatus further includes a feedback means, configured to:

feed back a loading state and/or a playback state of the target player to the page container.

In the video preview apparatus provided in this application, the video covers included in the video preview page are provided with corresponding page containers. The page container can provide a capability of detecting a preview operation for a corresponding video cover, that is, the page container of the target video cover can detect the preview operation. When the operation duration of the preview operation reaches the duration threshold, the player container associated with the page container of the target video cover can be determined, and the video content corresponding to the target video cover is played on the target video cover by using the target player carried in the player container. In this way, a user only needs to perform a preview operation for any video cover in the video preview page, to automatically preview corresponding complete video content on the video cover, so that the user fully interprets a video. In addition, original complete video content is directly played without a screenshot in a preview process. This manner can be adapted to screens with different resolution and can support a live video, thereby greatly improving a video preview effect. The user can preview the complete video content in the video preview page, to quickly and accurately determine whether the user is interested, thereby reducing a misplay rate. In addition, a corresponding player is invoked to play corresponding video content on a video cover for preview only when the operation duration of the preview operation reaches the duration threshold, thereby avoiding a misoperation in a sliding process and saving playback resources.

The foregoing describes a schematic solution of the video preview apparatus in this embodiment. It should be noted that the technical solution of the video preview apparatus and the technical solution of the foregoing video preview method belong to a same concept. For detailed content not described in detail in the technical solution of the video preview apparatus, refer to the descriptions of the technical solution of the foregoing video preview method.

Figure 6:
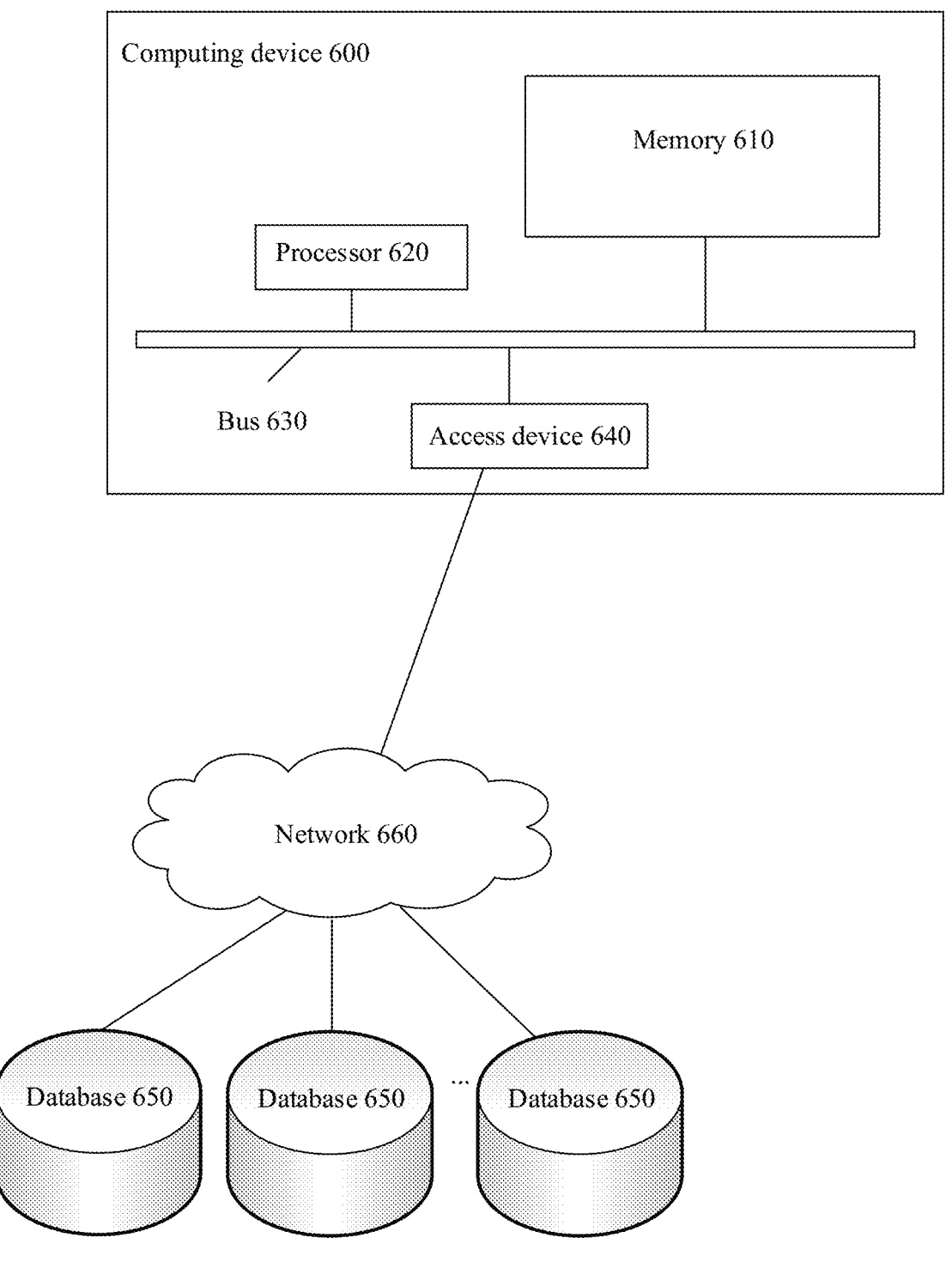
FIG. 6 is a block diagram of a structure of a computing device according to an embodiment of this application.

FIG. 6 is a block diagram of a structure of a computing device according to an embodiment of this application. Components of the computing device 600 include but are not limited to a memory 610 and a processor 620. The processor 620 is connected to the memory 610 by using a bus 630, and a database 650 is configured to store data.

The computing device 600 further includes an access device 640. The access device 640 enables the computing device 600 to perform communication by using one or more networks 660. Examples of these networks include a public switched telephone network (PSTN), a local area network (LAN), a wide area network (WAN), a private area network (PAN), or a combination of communication networks such as the Internet. The access device 640 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 600 and other components not shown in FIG. 6 may be connected to each other, for example, by using a bus. It should be understood that the block diagram of the structure of the computing device shown in FIG. 6 is merely used as an example instead of a limitation on the scope of this application. A person skilled in the art can add or replace other components as required.

The computing device 600 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device such as a desktop computer or a PC. The computing device 600 may alternatively be a mobile or stationary server.

The processor 620 is configured to execute the following computer-executable instructions to implement the following method:

detecting a preview operation for a target video cover in a video preview page, and determining operation duration of the preview operation, where the video preview page includes video covers of at least two videos, a page container is provided, in the video preview page, at a position where each video cover should theoretically be displayed, and the page container is used to detect a preview operation for a corresponding video cover;

determining a player container associated with a page container of the target video cover when the operation duration reaches a duration threshold, where the player container is used to carry a target player for playing video content; and loading the target player carried in the player container, and playing video content corresponding to the target video cover on the target video cover by using the target player.

The foregoing describes a schematic solution of the computing device in this embodiment. It should be noted that the technical solution of the computing device and the technical solution of the foregoing video preview method belong to a same concept. For detailed content not described in detail in the technical solution of the computing device, refer to the descriptions of the technical solution of the foregoing video preview method.

An embodiment of this application further provides a computer-readable storage medium. The computer-readable storage medium stores computer-executable instructions, and when the computer-executable instructions are executed by a processor, steps of any video preview method are implemented.

The foregoing describes a schematic solution of the computer-readable storage medium in this embodiment. It should be noted that the technical solution of the storage medium and the technical solution of the foregoing video preview method belong to a same concept. For detailed content not described in detail in the technical solution of the storage medium, refer to the descriptions of the technical solution of the foregoing video preview method.

An embodiment of this application further provides a computer program product. When the computer program product is executed in a computer, the computer is enabled to perform steps of any video preview method.

The foregoing describes a schematic solution of the computer program product in this embodiment. It should be noted that the technical solution of the computer program product and the technical solution of the foregoing video preview method belong to a same concept. For detailed content not described in detail in the technical solution of the computer program product, refer to the descriptions of the technical solution of the foregoing video preview method.

The foregoing describes specific embodiments of this application. Other embodiments fall within the scope of the appended claims. In some cases, actions or steps recorded in the claims may be performed in an order different from that in the embodiments and desired results may still be achieved. In addition, processes depicted in the accompanying drawings do not necessarily require a specific order or a sequential order shown to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include any entity or apparatus capable of carrying computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, or the like.

It should be noted that, for ease of description, the foregoing method embodiments are described as a combination of a series of actions. However, a person skilled in the art should understand that this application is not limited to the described action order, because according to this application, some steps may be performed in another order or simultaneously. In addition, a person skilled in the art should also be aware that the embodiments described in this specification are all preferred embodiments, and used actions and means are not necessarily mandatory to this application.

In the foregoing embodiments, the descriptions of the embodiments have respective focuses. For a part that is not described in detail in an embodiment, refer to related descriptions in other embodiments.

The preferred embodiments of this application disclosed above are merely intended to help describe this application. In the optional embodiments, not all details are described in detail, and this application is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method of implementing video preview, comprising:
    detecting a preview operation performed on a target video cover in a video preview page, wherein the video preview page comprises a plurality of video covers corresponding to a plurality of videos, wherein a page container is provided at a position where each video cover is displayed in the video preview page, and wherein each page container is configured to detect a preview operation performed on a corresponding video cover;

determining whether an operation duration of the preview operation reaches a duration threshold;

determining a player container associated with a page container of the target video cover in response to determining that the operation duration of the preview operation reaches the duration threshold, wherein the player container is configured to carry a target player of playing content of a video corresponding to the target video cover, wherein the player container is embedded as a sub-element of the page container of the target video cover, and wherein the page container is configured to monitor the preview operation performed on the target video cover;

loading the target player carried in the player container associated with the page container of the target video cover;

playing content of the video corresponding to the target video cover at a position of the target video cover in the video preview page through the target player;

detecting, by the page container, whether the preview operation on the target video cover is cancelled; and controlling the target player to pause playback of the content of the video based on the page container detecting that the preview operation on the target video cover is cancelled.

2. The method according to claim 1, wherein before detecting the preview operation performed on the target video cover in the video preview page, the method further comprises:

obtaining video metadata and a playback parameter that correspond to the target video cover;

creating the target player of playing the video corresponding to the target video cover based on the video metadata and the playback parameter; and creating the player container based on the target player.

3. The method according to claim 2, wherein the method further comprises:

separately encapsulating player instances corresponding to a plurality of video types before creating the target player of playing the video corresponding to the target video cover; and wherein the creating the target player of playing the video corresponding to the target video cover based on the video metadata and the playback parameter further comprises:

parsing the video metadata, determining a target video type and a content identifier that correspond to the target video cover based on the video metadata, invoking a player instance corresponding to the target video type based on the target video type, wherein the player instance is among the encapsulated player instances corresponding to the plurality of video types, and creating the target player corresponding to the target video cover based on the player instance, the content identifier, and the playback parameter.

4. The method according to claim 1, wherein the method further comprises:

encapsulating an intermediate operation layer, wherein the intermediate operation layer is configured to determine a playback operation corresponding to the detected preview operation; and wherein the playing content of the video corresponding to the target video cover at a position of the target video cover in the video preview page through the target player comprises:

determining the playback operation corresponding to the preview operation through the encapsulated intermediate operation layer, and controlling, based on the playback operation, the target player to play the content of the video corresponding to the target video cover at the position of the target video cover in the video preview page.

5. The method according to claim 1, wherein before loading the target player carried in the player container, the method further comprises:

determining whether the preview operation is a preview operation first detected for the target video cover in a first preset duration; and in response to determining that the preview operation is the preview operation first detected for the target video cover in the first preset duration, loading the target player carried in the player container associated with the page container of the target video cover.

6. The method according to claim 1, wherein the loading the target player and the playing content of the video corresponding to the target video cover at a position of the target video cover in the video preview page through the target player further comprises:

determining whether an initialization of the target player is completed;

initializing the target player in response to determining that the initialization of the target player is not completed; and playing the content of the video corresponding to the target video cover at the position of the target video cover through the target player after completing the initialization.

7. The method according to claim 1, wherein the method further comprises:

determining whether there is a playback permission of playing the content of the video corresponding to the target video cover before playing the content of the video in the video preview page through the target player;

in response to determining that there is the playback permission, determining whether the preview operation is cancelled; and in response to determining that the preview operation is not cancelled, playing the content of the video corresponding to the target video cover at the position of the target video cover through the target player.

8. The method according to claim 1, wherein the method further comprises:

determining whether the preview operation is cancelled after determining that an initialization of the target player is completed; and in response to determining that the preview operation is not cancelled, playing the content of the video corresponding to the target video cover at the position of the target video cover through the target player.

9. The method according to claim 1, wherein while playing the content of the video corresponding to the target video cover at the position of the target video cover through the target player, the method further comprises:

in response to detecting that the preview operation is cancelled, determining whether another preview operation is detected for the target video cover in a second preset duration from a cancellation of the preview operation; and disabling the target player in response to determining that no preview operation is detected in the second preset duration from the cancellation of the preview operation.

10. The method according to claim 1, wherein the method further comprises:

feeding back to the page container information indicative of a loading state or a playback state of the target player.

11. A computing device, comprising:

a memory and a processor, wherein the memory is configured to store computer-executable instructions, and the processor is configured to execute the computer-executable instructions to implement operations comprising:

detecting a preview operation performed on a target video cover in a video preview page, wherein the video preview page comprises a plurality of video covers corresponding to a plurality of videos, wherein a page container is provided at a position where each video cover is displayed in the video preview page, and wherein each page container is configured to detect a preview operation performed on a corresponding video cover;

determining whether an operation duration of the preview operation reaches a duration threshold;

determining a player container associated with a page container of the target video cover in response to determining that the operation duration of the preview operation reaches the duration threshold, wherein the player container is configured to carry a target player of playing content of a video corresponding to the target video cover, wherein the player container is embedded as a sub-element of the page container of the target video cover, and wherein the page container is configured to monitor the preview operation performed on the target video cover;

loading the target player carried in the player container associated with the page container of the target video cover;

playing content of the video corresponding to the target video cover at a position of the target video cover in the video preview page through the target player;

detecting, by the page container, whether the preview operation on the target video cover is cancelled; and controlling the target player to pause playback of the content of the video based on the page container detecting that the preview operation on the target video cover is cancelled.

12. The computing device according to claim 11, wherein before detecting the preview operation performed on the target video cover in the video preview page, the operations further comprise:

obtaining video metadata and a playback parameter that correspond to the target video cover;

creating the target player of playing the video corresponding to the target video cover based on the video metadata and the playback parameter; and creating the player container based on the target player.

13. The computing device according to claim 12, the operations further comprising:

separately encapsulating player instances corresponding to a plurality of video types before creating the target player of playing the video corresponding to the target video cover; and wherein the creating the target player of playing the video corresponding to the target video cover based on the video metadata and the playback parameter further comprises:

parsing the video metadata, determining a target video type and a content identifier that correspond to the target video cover based on the video metadata, invoking a player instance corresponding to the target video type, wherein the player instance is among the encapsulated player instances corresponding to the plurality of video types, and creating the target player corresponding to the target video cover based on the player instance, the content identifier, and the playback parameter.

14. The computing device according to claim 11, the operations further comprising:

encapsulating an intermediate operation layer, wherein the intermediate operation layer is configured to determine a playback operation corresponding to the detected preview operation; and wherein the playing content of the video corresponding to the target video cover at a position of the target video cover in the video preview page through the target player comprises:

determining the playback operation corresponding to the preview operation through the encapsulated intermediate operation layer, and controlling, based on the playback operation, the target player to play the content of the video corresponding to the target video cover at the position of the target video cover in the video preview page.

15. The computing device according to claim 11, the operations further comprising:

determining whether there is a playback permission of playing the content of the video corresponding to the target video cover before playing the content of the video through the target player;

determining whether the preview operation is cancelled in response to determining that there is the playback permission; and playing the content of the video corresponding to the target video cover in the video preview page through the target player in response to determining that the preview operation is not cancelled.

16. The computing device according to claim 11, wherein while playing the content of the video corresponding to the target video cover at the position of the target video cover through the target player, the operations further comprise:

in response to detecting that the preview operation is cancelled, determining whether another preview operation is detected for the target video cover in a second preset duration from a cancellation of the preview operation; and disabling the target player in response to determining that no preview operation is detected in the second preset duration from the cancellation of the preview operation.

17. The computing device according to claim 11, the operations further comprising:

feeding back to the page container information indicative of a loading state or a playback state of the target player.

18. A non-transitory computer-readable storage medium, wherein the computer-readable storage medium stores computer-executable instructions, and when the computer-executable instructions are executed by a processor, the computer-executable instructions cause the processor to implement operations comprising:

detecting a preview operation performed on a target video cover in a video preview page, wherein the video preview page comprises a plurality of video covers corresponding to a plurality of videos, wherein a page container is provided at a position where each video cover is displayed in the video preview page, and wherein each page container is configured to detect a preview operation performed on a corresponding video cover;

determining whether an operation duration of the preview operation reaches a duration threshold;

determining a player container associated with a page container of the target video cover in response to determining that the operation duration of the preview operation reaches the duration threshold, wherein the player container is configured to carry a target player of playing content of a video corresponding to the target video cover, wherein the player container is embedded as a sub-element of the page container of the target video cover, and wherein the page container is configured to monitor the preview operation performed on the target video cover;

loading the target player carried in the player container associated with the page container of the target video cover;

playing content of the video corresponding to the target video cover at a position of the target video cover in the video preview page through the target player;

detecting, by the page container, whether the preview operation on the target video cover is cancelled; and controlling the target player to pause playback of the content of the video based on the page container detecting that the preview operation on the target video cover is cancelled.

19. The non-transitory computer-readable storage medium according to claim 18, wherein before detecting the preview operation performed on the target video cover in the video preview page, the operations further comprise:

obtaining video metadata and a playback parameter that correspond to the target video cover;

creating the target player of playing the video corresponding to the target video cover based on the video metadata and the playback parameter; and creating the player container based on the target player.

20. The non-transitory computer-readable storage medium according to claim 19, the operations further comprising:

separately encapsulating player instances corresponding to a plurality of video types before creating the target player of playing the video corresponding to the target video cover; and wherein the creating the target player of playing the video corresponding to the target video cover based on the video metadata and the playback parameter further comprises:

parsing the video metadata, determining a target video type and a content identifier that correspond to the target video cover based on the video metadata, invoking a player instance corresponding to the target video type, wherein the player instance is among the encapsulated player instances corresponding to the plurality of video types, and creating the target player corresponding to the target video cover based on the player instance, the content identifier, and the playback parameter.

* * * * *